(12) United States Patent
Kurodai et al.

(10) Patent No.: US 7,109,915 B2
(45) Date of Patent: Sep. 19, 2006

(54) RADAR APPARATUS

(75) Inventors: Hiroshi Kurodai, Hitachi (JP); Shiho Izumi, Hitachi (JP); Kazuto Nakamura, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 10/785,007

(22) Filed: Feb. 25, 2004

(65) Prior Publication Data

US 2004/0196173 A1 Oct. 7, 2004

(30) Foreign Application Priority Data

Apr. 3, 2003 (JP) ............................. 2003-099790

(51) Int. Cl.
*G01S 13/42* (2006.01)
(52) U.S. Cl. ...................... 342/82; 342/70; 342/85; 342/107
(58) Field of Classification Search ............ 342/82–87, 342/70–72, 107–111, 192–196
See application file for complete search history.

(56) References Cited

U.S. PATENT DOCUMENTS

| | | | |
|---|---|---|---|
| 4,401,987 A * | 8/1983 | Cyr | 342/93 |
| 5,182,810 A | 1/1993 | Bartling et al. | |
| 5,416,488 A * | 5/1995 | Grover et al. | 342/159 |
| 5,621,412 A | 4/1997 | Sharpe et al. | |
| 5,828,333 A * | 10/1998 | Richardson et al. | 342/70 |
| RE36,095 E * | 2/1999 | Urabe et al. | 342/133 |
| 5,896,103 A * | 4/1999 | Bunch | 342/174 |
| 6,040,795 A | 3/2000 | Watanabe | |
| 6,175,325 B1 * | 1/2001 | Ono | 342/20 |
| 6,404,381 B1 | 6/2002 | Heide et al. | |
| 6,587,071 B1 * | 7/2003 | Meier | 342/70 |
| 2004/0196173 A1 * | 10/2004 | Kuroda et al. | 342/82 |

FOREIGN PATENT DOCUMENTS

| | | |
|---|---|---|
| JP | A-08-136646 | 5/1996 |
| JP | 10248162 | 9/1998 |
| JP | A-2003-030798 | 1/2003 |

* cited by examiner

Primary Examiner—John B. Sotomayor
(74) Attorney, Agent, or Firm—Crowell & Moring LLP

(57) ABSTRACT

In a radar apparatus for automobiles for transmitting a radio wave, receiving a radio wave reflected from an object and measuring a rate of the object, a digital signal processor has at least two operation modes, a normal operation mode and a low energy consumption mode, and has a function of switching between the operation modes of the digital signal processor in accordance with a signal supplied from a counter (judgement unit) for judging whether a received signal satisfies predetermined conditions. The radar apparatus can reduce consumption power when necessary.

11 Claims, 6 Drawing Sheets

RADAR APPARATUS

BACKGROUND OF THE INVENTION

The present invention relates to a radar apparatus for measuring a range, rate and azimuth angle of an object by transmitting an electromagnetic wave and receiving the wave reflected from the object.

A conventional radar system for automobiles transmits an electromagnetic wave such as light and a radio wave and receives the signal reflected from an object such as an automobile and an obstacle. A transmission time required for an electromagnetic wave to reach an object and return to the radar system, an intensity of the reflected signal, a Doppler shift frequency and the like are detected from the reflected signal to measure a range (distance), rate (relative speed) and azimuth angle of the object. The application field of a radar system is broad. A radar apparatus for automobiles has been developed recently which is mounted on an automobile to measure a range to a front vehicle. A radar apparatus is also applied to the field of home security systems as one kind of electromagnetic sensing means.

A radar apparatus utilizing a laser beam generally adopts a pulse method by which measures the range of an object from a travelling time required for a pulsed laser beam to reach the object and return to the apparatus. There are several methods for a radar apparatus utilizing a radio wave to measure a range and rate of an object. Known methods include: a two-frequency continuous wave (CW) method which switches two frequencies in a time duplex manner; a frequency modulated continuous wave (FMCW) method which performs triangular modulation of a transmission frequency; a pulse modulation method which measures the range of an object from a travelling time required for a pulsed wave to reach the object and return to the apparatus; and other methods. With the two-frequency CW method and FMCW method, a received signal is subjected to a fast Fourier transform (FFT) process and the range and rate of an object are measured from the frequency, phase and amplitude information of a peak signal in a frequency spectrum obtained by FFT.

An electric power for driving such a radar apparatus for automobiles is required to be generated in each vehicle. As described, for example, in JP-A-08-136646, power consumption is reduced by operating, at different timings, high frequency electronic equipment such as an oscillator and a modulator of a radar apparatus utilizing a radio wave.

With such a conventional method, however, although the consumption power can be reduced, the area to be covered by a radar apparatus is searched in a time division manner so that there is a possibility that some objects may not be detected.

SUMMARY OF THE INVENTION

An object of this invention is to provide a radar apparatus for automobiles having a function of reducing a consumption power while a radar search ability is retained.

In order to achieve the above object, the invention provides a radar apparatus for detecting an object comprising: transmitting means for transmitting an electromagnetic wave; and receiving means for receiving an electromagnetic wave reflected from the object, wherein: the radar apparatus has a first operation mode and a second operation mode requiring an energy consumption less than an energy consumption of the first operation mode; and the first operation mode and the second operation mode are switched in accordance with an output signal from the receiving means. The above object of the invention can also be achieved by a radar apparatus having a function of detecting one or more of a rate, a range and an azimuth angle of an object, comprising: transmitting means for transmitting an electromagnetic wave; receiving means for receiving an electromagnetic wave reflected from the object; A/D converting means for A/D converting a received signal from said receiving means; and digital signal processing means for processing an A/D converted digital signal, wherein the digital signal processing means has at least two operation modes, a normal operation mode and a low energy consumption mode and has a function of switching the operation modes in accordance with a signal supplied from judging means for judging whether a received signal satisfies predetermined conditions.

The above object of the invention can also be achieved by the radar apparatus wherein in the low energy consumption mode, the judging means has a function of judging whether an amplitude of the received signal exceeds a predetermined threshold level and a function of changing an operation mode of the digital signal processing means from the second operation mode to the first operation mode.

The above object of the invention can also be achieved by the radar apparatus wherein in the low energy consumption mode, the judging means has filtering means and a function of changing an operation mode of the digital signal processing means from the low energy consumption mode to the normal operation mode, when an amplitude of the received signal passed through the filtering means exceeds a predetermined threshold level.

The above object of the invention can also be achieved by the radar apparatus wherein the judging means has a function of counting the number of times when the amplitude of the received signal exceeds the predetermined threshold level.

The above object of the invention can also be achieved by the radar apparatus wherein the judging means has a function of changing judgement conditions of the judging means and a function of setting the judgement conditions when the digital signal processing means is in the normal operation mode.

The above object can also be achieved by the radar apparatus wherein: the digital signal processing means has judging means for judging whether the received signal satisfies predetermined conditions; and the digital signal processing means has a function of changing an operation mode of the digital signal processing means from the normal operation mode to the low energy consumption mode in response to a command from the judging means.

The above object can also be achieved by the radar apparatus wherein the digital signal processing means has judging means for judging whether the received signal satisfies predetermined conditions, and has a function of changing judgement conditions of the judging means.

The above object can also be achieved by the radar apparatus wherein the digital signal processing means has a function of inputting an operation mode switching signal from an external of the radar apparatus.

The above object can also be achieved by the radar apparatus further comprising communication means for communicating with an external and notifying the external of a state of the normal operation mode and the low energy consumption mode.

According to the invention, in a radar apparatus for automobiles for transmitting a radio wave, receiving a radio wave reflected from an object and measuring a rate of the object, a digital signal processor has at least two operation modes, a normal operation mode and a low energy consumption mode, and has a function of switching between the operation modes in accordance with a signal supplied from a counter (judgement unit) for judging whether a received signal satisfies predetermined conditions so that the radar apparatus can have a function of reducing power consumption while a radar sensing capability is retained.

Other objects, features and advantages of the invention will become apparent from the following description of the embodiments of the invention taken in conjunction with the accompanying drawings.

DESCRIPTION OF THE EMBODIMENTS

Embodiments of the invention will be described with reference to FIGS. 1 to 7.

Figure 1:
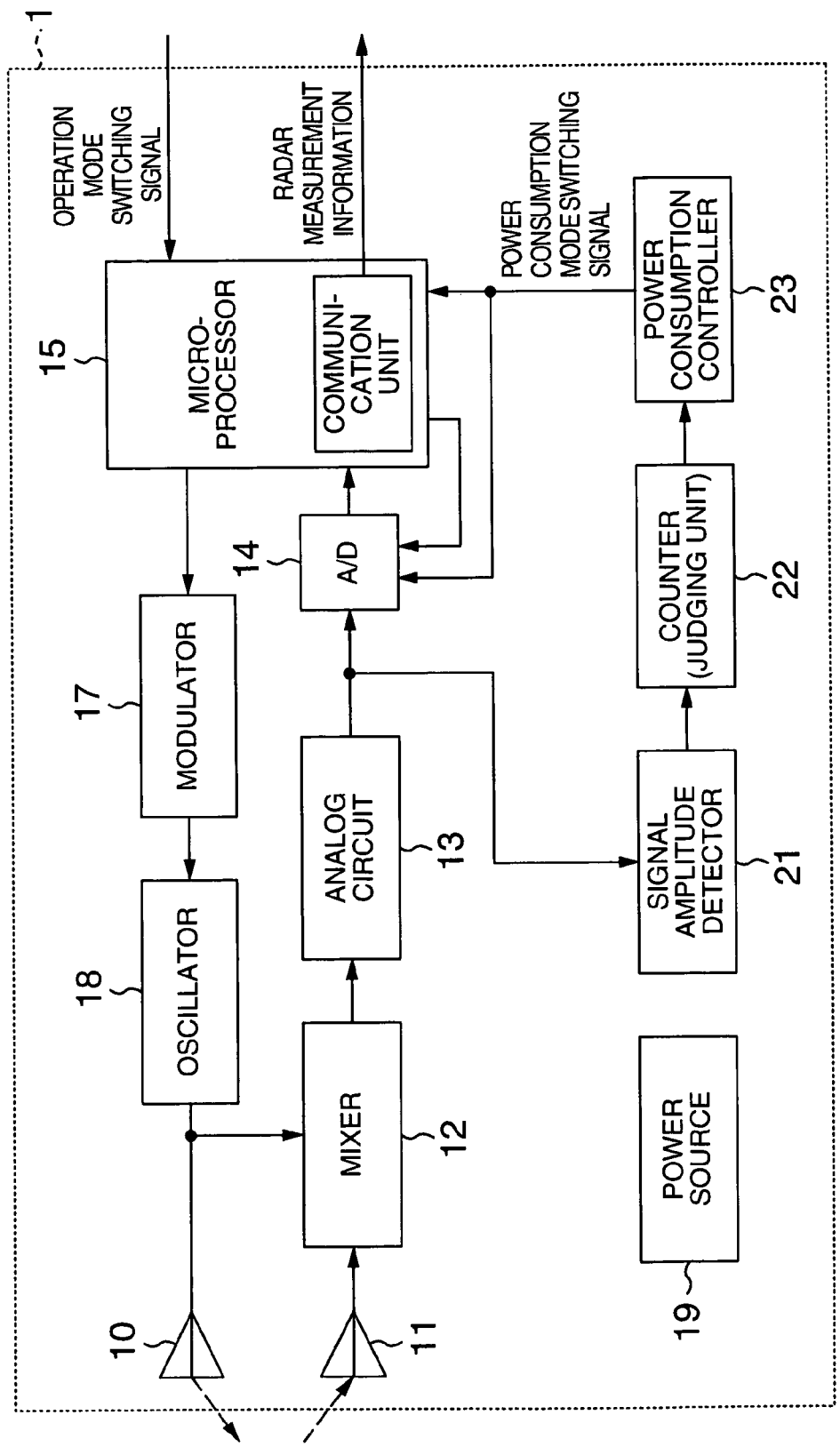
FIG. 1 is a block diagram showing the structure of a radar apparatus.

FIG. 1 is a block diagram showing the structure of a radar apparatus according to the invention.

The radar apparatus 1 transmits an electromagnetic wave to measure a range, rate, azimuth angle and the like of an object. An oscillator 18 of the radar apparatus 1 oscillates at a frequency determined by a modulation signal supplied from a modulator 17. A high frequency signal of electromagnetic waves from the oscillator is transmitted from a transmission antenna 10. For example, millimeter electromagnetic waves are used as a high frequency signal in a radar apparatus for automobiles.

A radio wave reflected from an object such as a vehicle and an obstacle is received by a reception antenna 11 and frequency-converted by a mixer 12. The mixer 12 is supplied with a fraction of an output signal from the oscillator 18 via a directional coupler (not shown). The signal from the oscillator and the signal received from the reception antenna are mixed to generate a beat signal which is sent to an analog circuit 13 to be amplified and demodulated. The beat signal output from the analog circuit 13 is converted into a digital signal by an A/D converter 14 and sent to a digital signal processor 15. The digital signal processor 15 analyzes the digitalized signal in a frequency domain through FFT to obtain a frequency, phase and amplitude of each digitalized signal to measure a range and rate of an object from which the radio wave was reflected. The information on the measured range and rate is output from the radar apparatus 1 as radar measurement information. The digital signal processor 15 is generally made of a microprocessor which has a normal operation mode and a low energy consumption mode.

Figure 6:
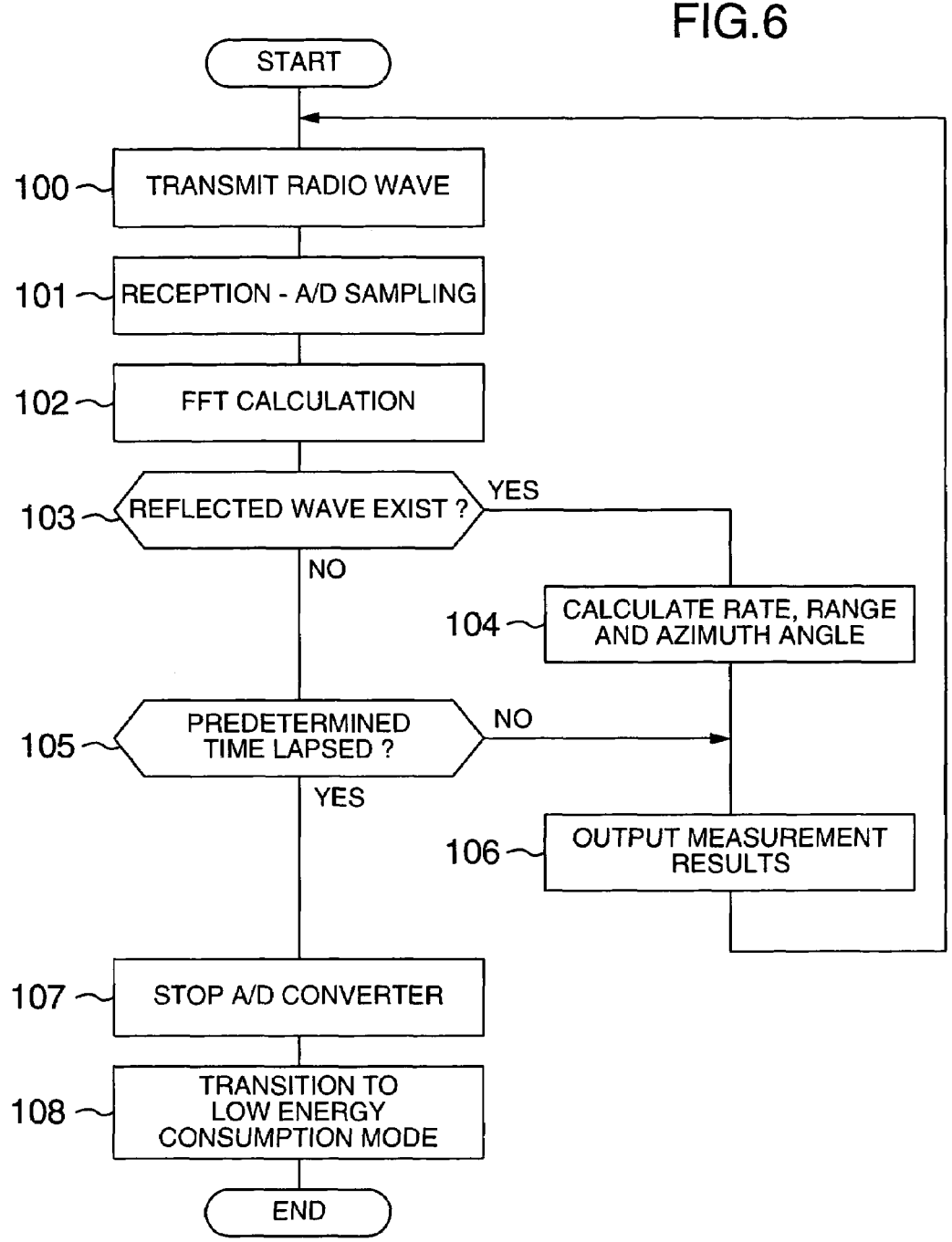
FIG. 6 is a flowchart illustrating a process of switching between operation modes.

First, with reference to the flowchart shown in FIG. 6, description will be made on the transition process from the normal operation mode to the low energy consumption mode respectively of the radar apparatus, the process being executed by the digital signal processor 15. During the normal operation mode of the radar apparatus, a radio wave is transmitted from the radar apparatus at Step 100. At Step 101 a radio wave reflected from a forward object is received and A/D converted. The A/D converted digital data is subjected to a FFT process at Step 102. At the next Step 103 it is judged from the result of the FFT process whether there exists a reflected wave having a predetermined level or higher. If there exists such a reflected wave, the flow advances to Step 104 whereat a rate, range and azimuth angle of the object are calculated from the result of the FFT process. At the next Step 106 the measurement results are output to an external of the radar apparatus. After a series of such processes is completed, the flow returns to Step 100 to repeat the above-described measurement process. If it is judged at Step 103 from the result of the FFT process that a reflected wave having the predetermined level or higher does not exist, the flow advances to Step 105 whereat it is judged whether the time period while such a reflected wave does not exist becomes longer than a predetermined time. If the time period does not exceed the predetermined time, the flow advances to Step 106 to continue the normal operation mode. If it is judged at Step 105 that the time period while such a reflected wave does not exist becomes longer than the predetermined time, the flow advances to Step 107 whereat the operation of the A/D converter 14 is stopped. At the same time, an unnecessary power supply to hardware during the low energy consumption mode may also be stopped. At the next Step 108 the digital signal processor itself transits to the low energy consumption mode. Transition to the low energy consumption mode may be performed by utilizing an electric signal to be input to the microprocessor in a hardware manner, by utilizing a software command input to the microprocessor, or by other means. Upon transition to the low energy consumption mode by a software command, a software standby mode for stopping the whole operation of the microprocessor or a sleep mode for operating a portion of the microprocessor may be used.

Figure 2:
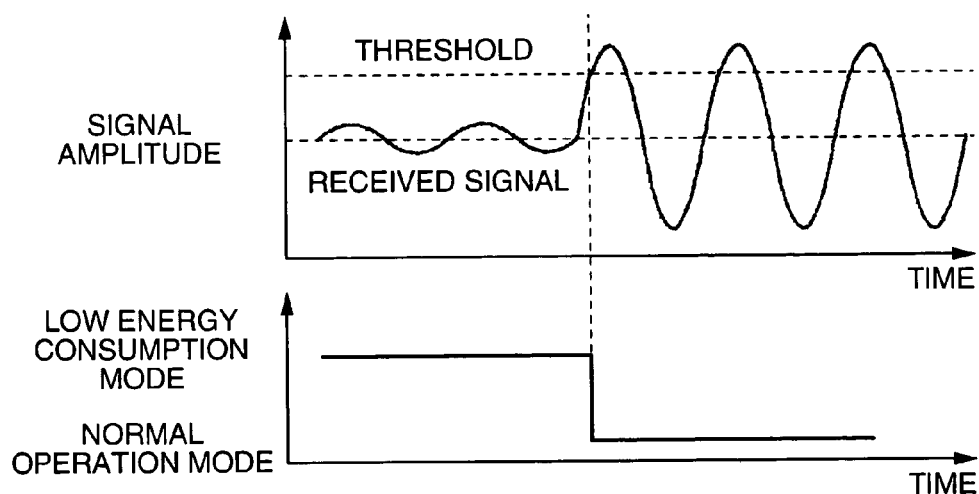
FIG. 2 is a diagram showing an example of a received signal and operation mode transition.

Next, description will be made on the recovery of the normal operation mode from the low energy consumption mode. As shown in FIG. 1, the radar apparatus has also a signal amplitude detector 21 for detecting an amplitude of a received analog signal and a counter (judging unit) 22 for judging the result of the signal amplitude detector. The analog circuit 13 outputs a received signal such as shown in FIG. 2. If an object does not exist in the radar sensing area, a reflected wave does not exist so that an amplitude of the received signal is small. When an object enters the radar sensing area, a reflected wave is generated so that an amplitude of the received signal becomes large as shown in FIG. 2. The signal amplitude detector 21 detects an amplitude change in the received signal at a predetermined threshold value. In accordance with the result of the signal amplitude detector, a power consumption controller 23 changes the operation mode of the digital signal processor 15 from the low energy consumption mode to the normal operation mode. At the same time, the A/D converter 14 is changed to the normal operation mode.

Figure 3:
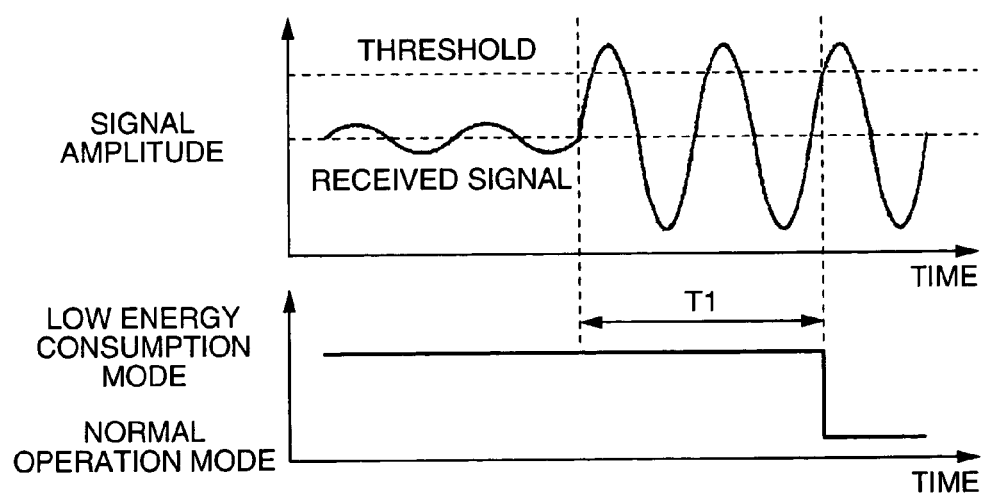
FIG. 3 is a diagram showing another example of a received signal and operation mode transition.
Figure 4:
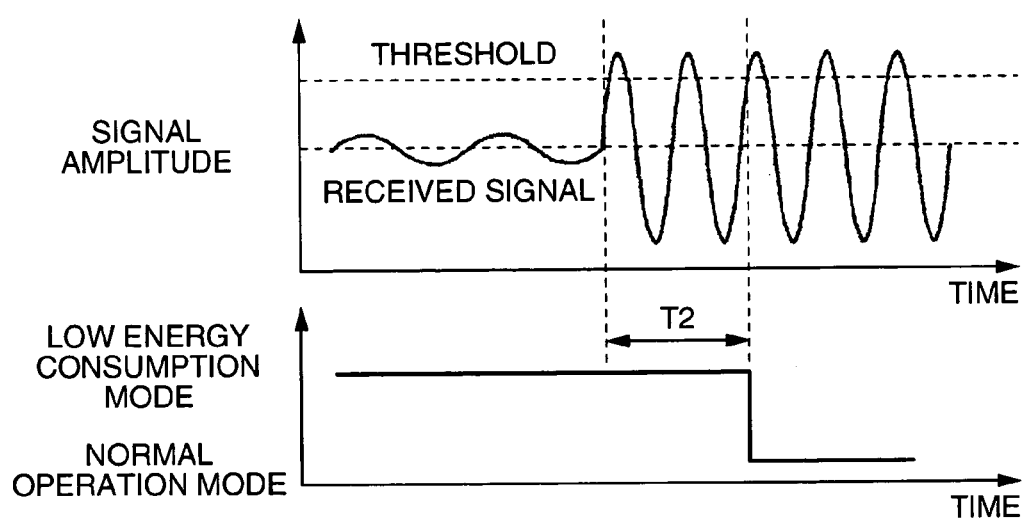
FIG. 4 is a diagram showing another example of a received signal and operation mode transition.

In the example shown in FIG. 2, the operation mode of the digital signal processor 15 is changed when the amplitude of the received signal exceeds the predetermined threshold value. The counter 22 may perform a judgement process after the signal amplitude detector 21 detects an amplitude change in the received signal. This example is illustrated in FIGS. 3 and 4. The counter 22 counts the number of amplitude changes of the received signal detected by the signal amplitude detector 21. In the examples shown in FIGS. 3 and 4, when the received signal exceeds the threshold value three times, it is judged that the operation mode is to be changed. By incorporating such a judgement process, more correct judgement becomes possible. In a radar apparatus of the type that it detects a received signal as a Doppler signal generated based upon a relative motion between the radar and objects. In the example shown in FIG. 3, the speed of an object is slow and the Doppler frequency is low, whereas in the example shown in FIG. 4, the speed of an object is fast and the Doppler frequency is high. In such a case that the counter 22 counts the number of times when the received signal exceeds the predetermined threshold value, the time when the operation mode of the digital signal processor 15 is changed after the reflected signal is received can be set differently such as at T1 in FIG. 3 and at T2 in FIG. 4 in accordance with the speed of the object. This performance is suitable for a radar apparatus because an object moving at a faster speed can be detected more quickly.

In the radar apparatus shown in FIG. 1, although a signal is sent from the analog circuit 13 to the signal amplitude detector 21, an output signal of the mixer 12 may be sent directly to the signal amplitude detector 21 to perform the processes similar to those described above.

Another embodiment will be described with reference to FIG. 5. A received signal output from the analog circuit 13 contains unnecessary frequency components such as signals reflected from objects other than the target object. A filter 24 filters the output signal from the analog circuit to output only a necessary signal whose amplitude is to be detected by the signal amplitude detector 21. The filter 24 may be one of a low pass filter, a high pass filter and a band pass filter.

Figure 7:
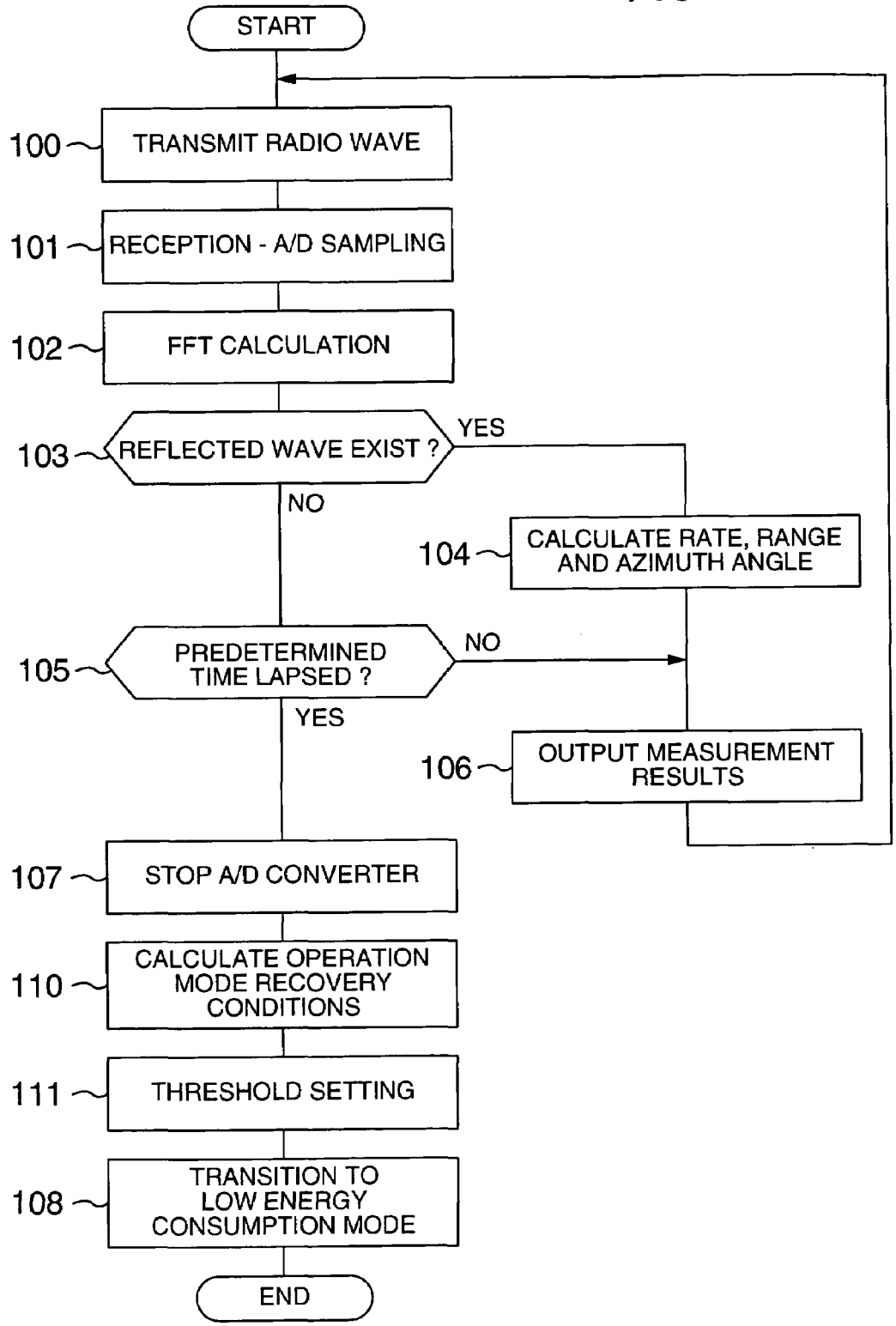
FIG. 7 is a flowchart illustrating a process of switching between operation modes.

The operation of this embodiment will be described with reference to FIG. 5 and the flowchart shown in FIG. 7. The filter 24 for detecting the state of a received signal has a function of changing its filter constants in accordance with a signal supplied from the digital signal processor 15. The signal amplitude detector 21 has a function of changing the threshold value at which the received signal is detected, in accordance with a signal supplied from the digital signal processor 15. The counter 22 has a function of changing its judgement criterion in accordance with a signal supplied from the digital signal processor 15. In the normal operation mode, the digital signal processor 15 measures in advance the received signal characteristics such as an amplitude in each frequency band. In accordance with the received signal characteristics, the digital signal processor calculates the conditions of transition from the low energy consumption mode again to the normal operation mode and sets the conditions to one of the filter 24, signal amplitude detector 21 and counter 22. By using this set threshold value, the normal operation mode is recovered so that the operation mode switching conditions of the radar apparatus 1 is made variable depending upon external environments which change from time to time. This process flow is illustrated in FIG. 7. Processes up to Step 107 are similar to those shown in FIG. 6. At Step 110, the conditions of recovering the normal operation mode are calculated from the already measured information. In accordance with the calculated results, filter constants are set to the filter 24, threshold values at which a received signal is detected are set to the signal amplitude detector 21, and the judgement criterion is set to the counter 22, respectively at Step 111. These settings can be realized, for example, by changing the constants of resistors in the analog circuit. In this example, although the characteristics of all the filter 24, signal amplitude detector 21 and counter 22 are changed in response to a signal supplied from the digital signal processor 15, the characteristics of one or more of these devices may also be changed.

Figure 5:
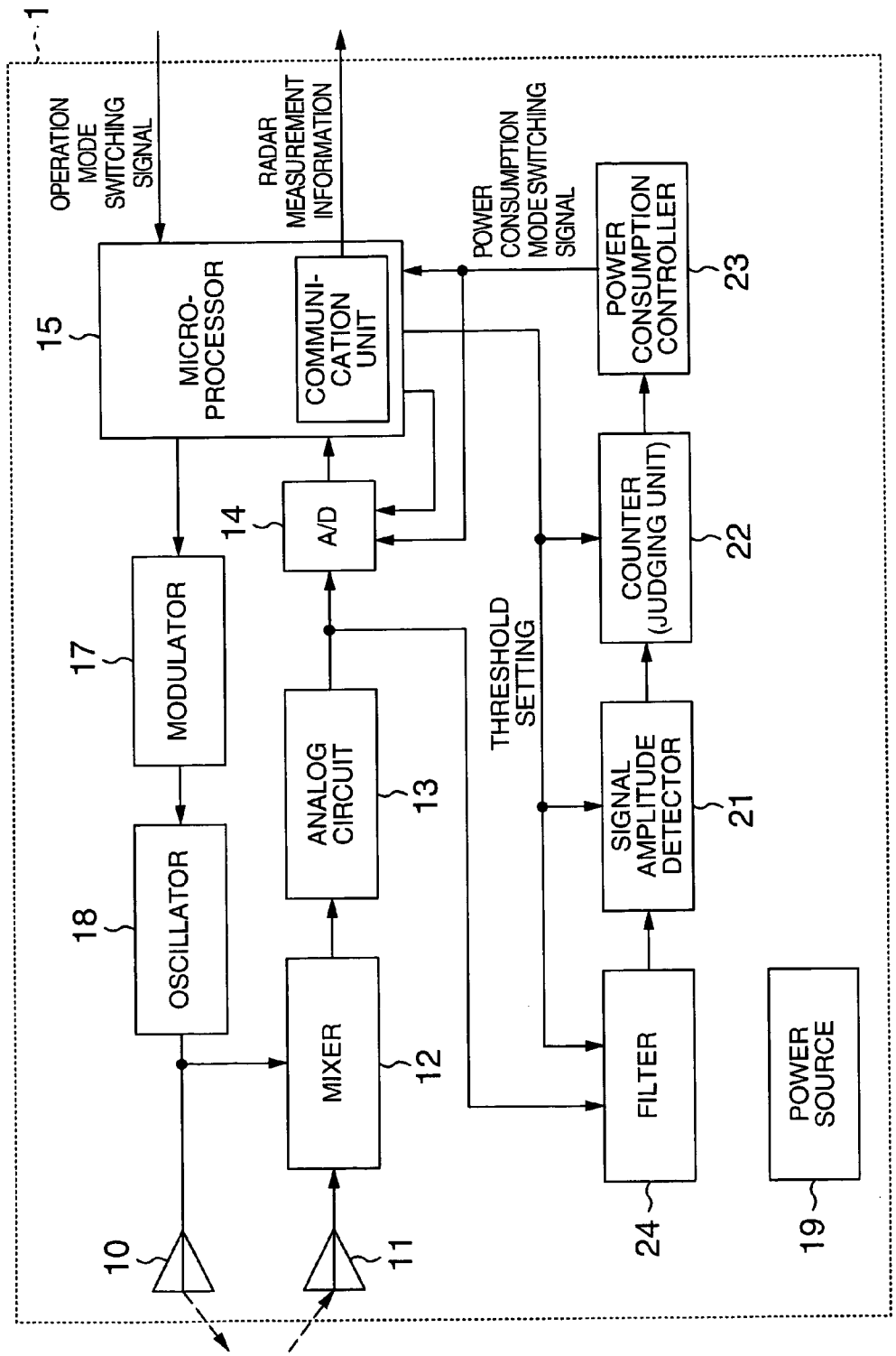
FIG. 5 is a block diagram showing the structure of a radar apparatus.

In the radar apparatus shown in FIG. 1 or 5, the normal operation mode and low energy consumption mode may be switched in response to an operation mode switching signal supplied from an external of the radar apparatus.

If the digital signal processor 15 is made of a microprocessor, the low energy consumption mode includes a hardware standby mode, a software standby mode and a sleep mode. In the hardware standby mode and software standby mode, the normal operation mode may be recovered upon input of a predetermined signal to a predetermined terminal of the microprocessor. In the example shown in FIG. 1, this can be realized by inputting a signal from the power consumption controller 23 to a predetermined terminal of the microprocessor or by inputting the operation mode switching signal supplied from the external of the radar apparatus.

In the sleep mode, a portion of the microprocessor continues to operate so that the normal operation mode can be recovered in response to an interrupt signal or a communication command supplied from the external of the radar apparatus. In this case, since a communication unit (in the microcomputer) can be operated even in the low energy consumption mode, an external apparatus can be notified via the communication unit the fact that the radar apparatus are operating in the low energy consumption mode.

Although the embodiments of the invention have been described by using mainly a radio wave radar, the invention may also be embodied by using a laser radar.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radar apparatus for detecting an object comprising:
    transmitting means for transmitting an electromagnetic wave; and
    receiving means for receiving an electromagnetic wave reflected from the object,
    wherein:
    the radar apparatus has a first operation mode and a second operation mode requiring an energy consumption less than an energy consumption of the first operation mode; and
    the first operation mode and the second operation mode are switched in accordance with an output signal from said receiving means.

2. The radar apparatus according to claim 1, further comprising:
    A/D converting means for A/D converting a signal supplied from said receiving means; and
    digital signal processing means for processing an A/D converted digital signal,
    wherein:
    the radar apparatus has a function of detecting one or more of a relative velocity, a range and an azimuth angle of the object; and
    said digital signal processing means has at least two operation modes, the first operation mode and the second operation mode and has a function of switching the operation modes in accordance with a signal supplied from judging means for judging whether a received signal satisfies predetermined conditions.

3. The radar apparatus according to claim 2, wherein:
in the second operation mode, said judging means has a function of judging whether an amplitude of the received signal exceeds a predetermined threshold level and a function of changing an operation mode of said digital signal processing means from the second operation mode to the first operation mode.

4. The radar apparatus according to claim 2, wherein:
in the second operation mode, said judging means has filtering means and a function of changing an operation mode of said digital signal processing means from the second operation mode to the first operation mode, when an amplitude of the received signal passed through said filtering means exceeds a predetermined threshold level.

5. The radar apparatus according to claim 3, wherein said judging means has a function of counting a number of times when the amplitude of the received signal exceeds the predetermined threshold level.

6. The radar apparatus according to claim 2, wherein said judging means has a function of changing judgment conditions of said judging means and a function of setting the judgment conditions when said digital signal processing means is in the first operation mode.

7. A radar apparatus for detecting one or more of a relative velocity, a range and an azimuth angle of an object, comprising:
transmitting means for transmitting an electromagnetic wave;
receiving means for receiving an electromagnetic wave reflected from the object;
A/D converting means for A/D converting a received signal; and
digital signal processing means for processing an A/D converted digital signal,
wherein:
said digital signal processing means has at least two operation modes, a first operation mode and a second operation mode;
said digital signal processing means has judging means for judging whether the received signal satisfies predetermined conditions; and
said digital signal processing means has a function of changing an operation mode of said digital signal processing means from the first operation mode to the second operation mode in response to a command from said judging means.

8. The radar apparatus according to claim 7, wherein the radar apparatus has a function of changing judgment conditions of said judging means.

9. A radar apparatus for detecting one or more of a relative velocity, a range and an azimuth angle of an object, comprising:
transmitting means for transmitting an electromagnetic wave;
receiving means for receiving an electromagnetic wave reflected from the object;
A/D converting means for A/D converting a received signal; and
digital signal processing means for processing an A/D converted digital signal,
wherein:
said digital signal processing means has at least two operation modes, a normal operation mode and a low energy consumption mode, and a function of inputting an operation mode switching signal from an external of the radar apparatus.

10. The radar apparatus according to claim 2, further comprising communication means for communicating with an external and notifying the external of a state of a normal operation mode and a low energy consumption mode.

11. The radar apparatus according to claim 2, wherein said second operation mode is carried out by stopping a part of operation of a microprocessor and an A/D converter within said radar apparatus.

* * * * *

UNITED STATES PATENT AND TRADEMARK OFFICE
CERTIFICATE OF CORRECTION

PATENT NO.        : 7,109,915 B2  
APPLICATION NO. : 10/785007  
DATED             : September 19, 2006  
INVENTOR(S)       : Hiroshi Kuroda, Shiho Izumi and Kazuto Nakamura It is certified that error appears in the above-identified patent and that said Letters Patent is hereby corrected as shown below:

On Title Page, should read,  
Item (75) Inventors:    Hiroshi Kuroda; Hitachi (JP);  
                        Shiho Izumi, Hitachi (JP);  
                        Kazuto Nakamura, Hitachinaka (JP)

Signed and Sealed this

Sixth Day of March, 2007

JON W. DUDAS  
*Director of the United States Patent and Trademark Office*